United States Patent [19]

Shibata et al.

[11] Patent Number: 5,535,277
[45] Date of Patent: Jul. 9, 1996

[54] ENCRYPTION COMMUNICATION APPARATUS

[75] Inventors: Kohichi Shibata; Mitsuhiro Nakamura, both of Osaka, Japan

[73] Assignee: Mita Industrial Co., Ltd., Osaka, Japan

[21] Appl. No.: 399,583

[22] Filed: Mar. 7, 1995

[30] Foreign Application Priority Data

Mar. 10, 1994 [JP] Japan .................................. 6-039984
Mar. 29, 1994 [JP] Japan .................................. 6-059166

[51] Int. Cl.⁶ .................................................... H04L 9/28
[52] U.S. Cl. .................. 380/28; 380/9; 380/17; 380/18; 380/49
[58] Field of Search .................. 380/9, 10, 17, 380/18, 20, 28, 46, 49

[56] References Cited

U.S. PATENT DOCUMENTS

| | | | |
|---|---|---|---|
| 4,091,423 | 5/1978 | Branscome | 380/18 |
| 4,140,873 | 2/1979 | Kinch, Jr. et al. | 380/18 X |
| 4,459,611 | 7/1984 | Arai et al. | 380/18 X |
| 4,985,919 | 1/1991 | Naruse et al. | 380/18 |
| 5,001,750 | 3/1991 | Kato et al. | 380/18 |
| 5,166,977 | 11/1992 | Ross | 380/18 |

*Primary Examiner*—Bernarr E. Gregory
*Attorney, Agent, or Firm*—Antonelli, Terry, Stout & Kraus

[57] ABSTRACT

An encryption communication apparatus of the present invention is embodied, for example, by a facsimile machine. A document original of plural pages set on the facsimile machine is read by a scanner section, and converted into image data on a page-by-page basis. A value N1 represents the second of the clock time at which the reading of each page of the document original is completed, and binary-coded data in an N1-th bit position counted from the front bit of each page of image data is inverted. Then, the image data is subjected to a predetermined encryption process, and transmitted in the form of facsimile signals via a communication line. Binary-coded data corresponding to a given pixel in the front portion (left upper portion) of the image data on each page of the document original is inverted. Therefore, even if a third party obtains the encrypted data corresponding to the front portion of the image data, decryption is very difficult and encryption security is ensured.

9 Claims, 8 Drawing Sheets

| |
|---|
| $C(1,1) = E\{P(1,1)(+)C(0)\}$ |
| $C(1,2) = E\{P(1,2)(+)C(1,1)\}$ |
| $\vdots$ |
| $C(1,k) = E\{P(1,k)(+)C(1,k-1)\}$ |
| $\vdots$ |
| $C(1,n-1) = E\{P(1,n-1)(+)C(1,n-2)\}$ |
| $C(1,n) = E\{P(1,n)(+)C(1,n-1)\}$ |

PAGE 1

| |
|---|
| $C(2,1) = E\{P(2,1)(+)C(0)\}$ |
| $C(2,2) = E\{P(2,2)(+)C(2,1)\}$ |
| $\vdots$ |
| $C(2,k) = E\{P(2,k)(+)C(2,k-1)\}$ |
| $\vdots$ |
| $C(2,n-1) = E\{P(2,n-1)(+)C(2,n-2)\}$ |
| $C(2,n) = E\{P(2,n)(+)C(2,n-1)\}$ |

PAGE 2

| |
|---|
| $C(3,1) = E\{P(3,1)(+)C(0)\}$ |
| $\vdots$ |

PAGE 3

ENCRYPTION COMMUNICATION APPARATUS

BACKGROUND OF THE INVENTION

The present invention relates to encryption communication apparatuses for improved security management of communication data and, more particularly, to an encryption communication apparatus for performing encryption communication by dividing information into plural data in page units of a given sheet size of a document original and encrypting the information on a page-by-page basis.

Conventionally, so-called encryption communications are employed to enhance data security in communications among a plurality of terminals including telephones, radiophones, facsimile machines and personal computers.

In a facsimile machine, for example, original image data of a document original to be transmitted is first encrypted by using a secret encryption key, and then the encrypted data is sent out to a communication line. In a recipient facsimile machine, the received encrypted data is decrypted by using the same secret key as employed in the encryption process in the transmitter facsimile machine (or the original image data is reproduced).

Figure 8:
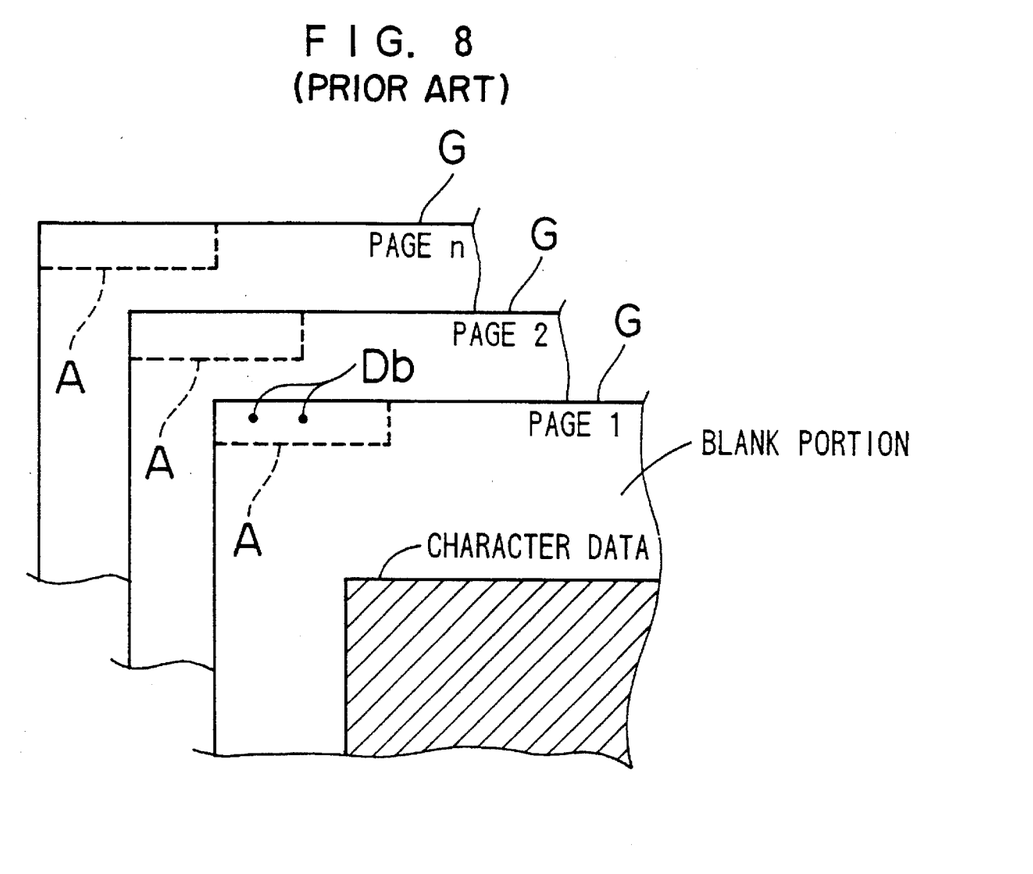
FIG. 8 is a diagram for explaining a method of enhancing the encryption security employed in a conventional image data encryption communication.

In general, the transmitter facsimile machine starts reading the document original for transmission from the upper side thereof. For example, the reading of the document original for transmission is started from a left upper portion A of a document original G as shown in FIG. 8. In accordance with the standard document specification defined by the International Consultation Committee for Telegraph and Telephone (CCITT), the portion A is a blank portion and, therefore, the first portion of encrypted data to be transmitted corresponds to the first portion of the decrypted data which further corresponds to the blank portion of the original document.

Accordingly, a third party intercepting the first portion of the transmitted encrypted data can know both the decrypted data corresponding to the blank portion and the encrypted data corresponding to the decrypted data and easily analyze the correlation between the decrypted data 5 and the encrypted data (i.e., encryption algorithm). This allows the encrypted data to be easily decrypted, thereby endangering the communication security.

To cope with this problem, it may be proposed that one or more pixels Db, preliminarily designated in the left upper portion A of the original document G to be first read, are subjected to a black-and-white reversion process before the data encryption and data transmission. Since the first portion of the transmitted encrypted data does not perfectly correspond to the decrypted data corresponding to the blank portion, the encrypted data cannot be easily decrypted.

In accordance with this art, however, part of the original image data corresponding to specific pixels of the document original is subjected to the black-and-white reversion process, and if a document original of plural pages is to be transmitted, the first portions of the encrypted data corresponding to first transmitted blank portions of the second and later pages of the document original are all the same. Therefore, the encryption algorithm used therein can easily be analyzed for decryption of the data.

Further, in PC communications which allow a personal computer to transmit PC data to a recipient facsimile machine via a recently commercialized fax modem, the aforesaid problem may occur when the data encrypted on a page-by-page basis are transmitted.

SUMMARY OF THE INVENTION

It is an object of the present invention to provide an encryption communication apparatus which is adapted to encrypt information including binary-coded data strings of plural bits for data transmission and which has an enhanced data security capability.

It is another object of the present invention to provide an encryption communication apparatus which can receive and decrypt encrypted data transmitted from the aforesaid encryption communication apparatus.

An encryption communication apparatus of the present invention for achieving the former object has the following features:

(1) The encryption communication apparatus is adapted to: designate, for every unit of data of a predetermined standard size, one or more bit positions in a front portion thereof having a predetermined bit number; invert the binary-coded data in the designated bit positions; subject the unit of data, including the inverted binary-coded data, to an encryption process to generate encrypted data; and transmit the generated encrypted data to a communication line.

In this encryption communication apparatus, transmission information, including binary-coded data strings of plural bits, is divided into plural units of data of the predetermined standard size, and these units of data are encrypted for data transmission after binary-coded data in one or more bit positions in the front portions of the respective unit data are inverted.

Since encrypted data in the front portion of the units of data is different for every data communication, a cryptanalysis by a third party becomes difficult. Thus, the security of the communication data can be ensured.

(2) The inversion of data bits is carried out based on a random number generated for every unit of data.

Accordingly, the bit positions of the inverted binary-coded data in respective units of data are different from each other and, hence, the cryptanalysis by a third party becomes more difficult.

(3) The random number may be generated based on a value of a second of a clock time to easily designate the bit position for random inversion.

(4) The transmission information may be divided into plural units of data on a basis of sheet-sized image data.

(5) The encryption communication apparatus may read the image data of a document original of plural pages on a page-by-page basis to obtain units of data corresponding to each page of the document original, and designate for every unit of data one or more bit positions in the front portion thereof.

In a facsimile machine adapted to print out the transmitted image data on paper sheets on a unit data basis, for example, data corresponding to the front portions (or blank portions) of respective paper sheets have different encryption patterns. Therefore, the security of the transmission data can be enhanced.

(6) The encryption communication apparatus adapted to read image data of a document original on a page-by-page basis may detect the value of second of a clock time when the reading of one-page of image data of the document original is completed, designate a bit position in the one-page of image data of the document original based on the detected second-value, and invert binary-coded data in the designated bit position.

Thus, the bit position for the random inversion can be easily and quickly designated.

An encryption communication apparatus of the present invention for achieving the latter object has the following features:

(7) The encryption communication apparatus is adapted to: receive encrypted data which is transmitted through a communication line from an encryption communication apparatus as set forth above, subject the received encrypted data to a decryption process to reproduce the pre-encryption original image data; identify the inverted original image data in the reproduced original image data; and invert the identified original image data.

In this encryption communication apparatus, the received encrypted data is subjected to the decryption process for reproduction of the original image, and the original image data which have been subjected to the bit inversion in the transmitter communication apparatus are identified. Then, the identified original image data are inverted, e.g., white and black points are inverted relative to each other in the image. Therefore, the exact original image data corresponding to the original document can be reproduced.

(8) The identification of the inverted binary-coded data may be achieved by searching for binary-coded data having a binary value different from other binary-coded data in the front portion of the unit data.

These and other objects and features of the present invention will become more apparent from the following detailed description and the accompanying drawings.

DETAILED DESCRIPTION OF THE PREFERRED EMBODIMENTS

An encryption communication apparatus according to the present invention will hereinafter be described by taking the case of a facsimile machine. The application of the present invention is not limited to the facsimile machine, but the present invention can be applied to various encryption communication apparatuses, such as personal computers, which can perform encryption data communications on a page-by-page basis.

Figure 1:
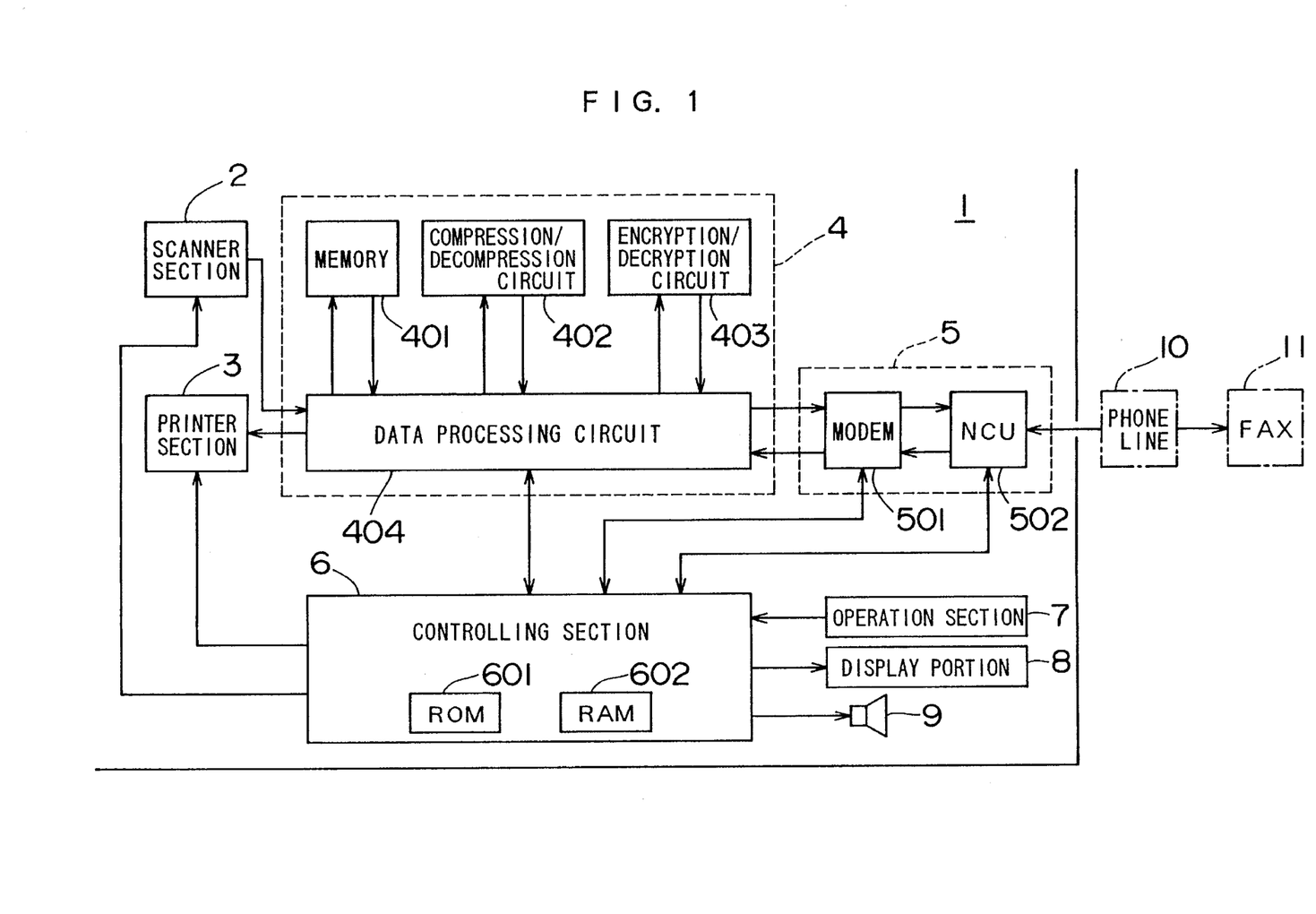
FIG. 1 is a block diagram of a facsimile machine (encryption communication apparatus) in accordance with the present invention.

FIG. 1 is a block diagram of a facsimile machine in accordance with the present invention. The facsimile machine 1 is may be a G3 type facsimile machine which can transmit and receive data encrypted in a CBC (cipher block chain) mode and transfer data at a high transmission speed, but it is not limited thereto (the transmission and reception of encrypted data will hereinafter be referred to as "encryption communications"). The facsimile machine 1 may be of a G4 type or any other standard-compliant type.

The facsimile machine 1 includes a scanner section 2 for reading a document original to be transmitted to a facsimile machine 11 of a communication counterpart, a printer section 3 for printing out the data read by the scanner section 2 (hereinafter referred to as "transmission data") and data received from the facsimile machine 11 (hereinafter referred to as "reception data") on a paper sheet, a data processing section 4 for performing predetermined data processing to the transmission data and reception data, a data transferring section 5 for transmitting and receiving data via a telephone line 10, and a controlling section 6 for controlling the operations of the scanner section 2, printer section 3, data processing section 4 and data transferring section 5.

The controlling section 6 incorporates a ROM (Read Only Memory) 601 for storing therein processing programs for the facsimile function and printer function and data used for various processings (e.g., data concerning operational conditions such as the illumination of a light source in the scanner section 2 and the density of image to be developed in the printer section 3, and data concerning messages for warnings and operation procedures), and a RAM (Random Access Memory) 602 for performing predetermined arithmetic operations in accordance with the processing programs.

The RAM 602 has work areas for arithmetic operations and data areas. Stored in the data areas are initial data IV for encryption processing in CBC mode and encryption keys K having particular bit strings, which are input from an operation section 7 for registration thereof by a user. These data can be changed or deleted as required after the registration. The encryption keys are registered in an encryption key table as shown in Table 1. The encryption key table contains encryption key numbers and ten-digit encryption keys K. The encryption key numbers correspond to index numbers in the encryption key table. For example, ten encryption keys K can be registered in an encryption key table as shown in Table 1. A user can assign a ten-digit number to any one of the encryption key numbers for the registration of an encryption key K, which can be later changed or deleted as required. In Table 1, no encryption key is registered in the encryption keys No.3 and No.9.

TABLE 1

| No. | Encryption key |
| --- | --- |
| 1 | 0123456789 |
| 2 | 1112223334 |
| 3 | |
| 4 | 9856124385 |
| . | . |
| . | . |
| . | . |
| 9 | |
| 10 | 1467764135 |

The facsimile machine 1 further includes an operation section 7 having key switches such as ten keys and one-touch keys, a display portion 8 having an LCD (liquid crystal display) and LEDs (light emitting diodes), and a speaker 9. Control signals for controlling the operation section 7, display portion 8 and speaker 9 are input and output to/from the controlling section 6.

The scanner section 2 includes an automatic document-original transporting portion for transporting a document original placed thereon, a scanning head having a CCD (Charge Coupled Device) line image sensor and an image processing section. An image of the document original is read in a document transportation direction on a line-by-line basis by moving the document original relative to the scanning head for scanning. The read data is subjected to predetermined image processings such as level correction, gamma correction and A/D conversion, and then output to the data processing section 4.

The printer section 3 is a laser printer which includes a light emitting portion for outputting image data in a form of a laser beam converted from modulation signals generated based on an image to be printed out (hereinafter referred to as "print image"), a photoconductive portion for forming thereon a latent image of the print image by the laser beam emitted from the light emitting portion, a developer portion for developing the latent image of the print image formed on the photoconductive portion, a transfer portion for transferring the developed print image on a paper sheet for image formation, and a fixing portion for fixing the print image transferred on the paper sheet.

The data processing section 4 includes a memory 401 for storing therein transmission data and reception data, a compression/decompression circuit 402 for compressing and decompressing data, an encryption/decryption circuit 403 for encrypting transmission data and decrypting reception data, and a data processing circuit 404 for controlling the compression/decompression process, coding/decoding process and encryption/decryption process to be performed for processing the transmission and reception data as required.

The memory 401 is a large-capacity memory capable of storing image data equivalent to about 100 pages of a standard A4-sized document original, allowing for facsimile reception subrogation, confidential facsimile reception and facsimile transmission reservation. The compression/decompression circuit 402 is adapted to compress transmission data and decompress reception data in compliance with the T4 recommendation proposed by International Telecommunication Union (ITU-T). The compression/decompression circuit 402 performs transmission data compression and reception data decompression, for example, based on the MMR (Modified Modified Relative element address designate) encoding system. Alternatively, the transmission data compression and reception data decompression may be based on the MH (Modified Huffman) or MR (Modified Relative element address designate) encoding system.

The encryption/decryption circuit 403 is adapted to encrypt and decrypt data by using a predetermined encryption key K. The encryption/decryption circuit 403 encrypts the transmission data in accordance with an encryption process as shown in FIG. 2.

Figure 2:
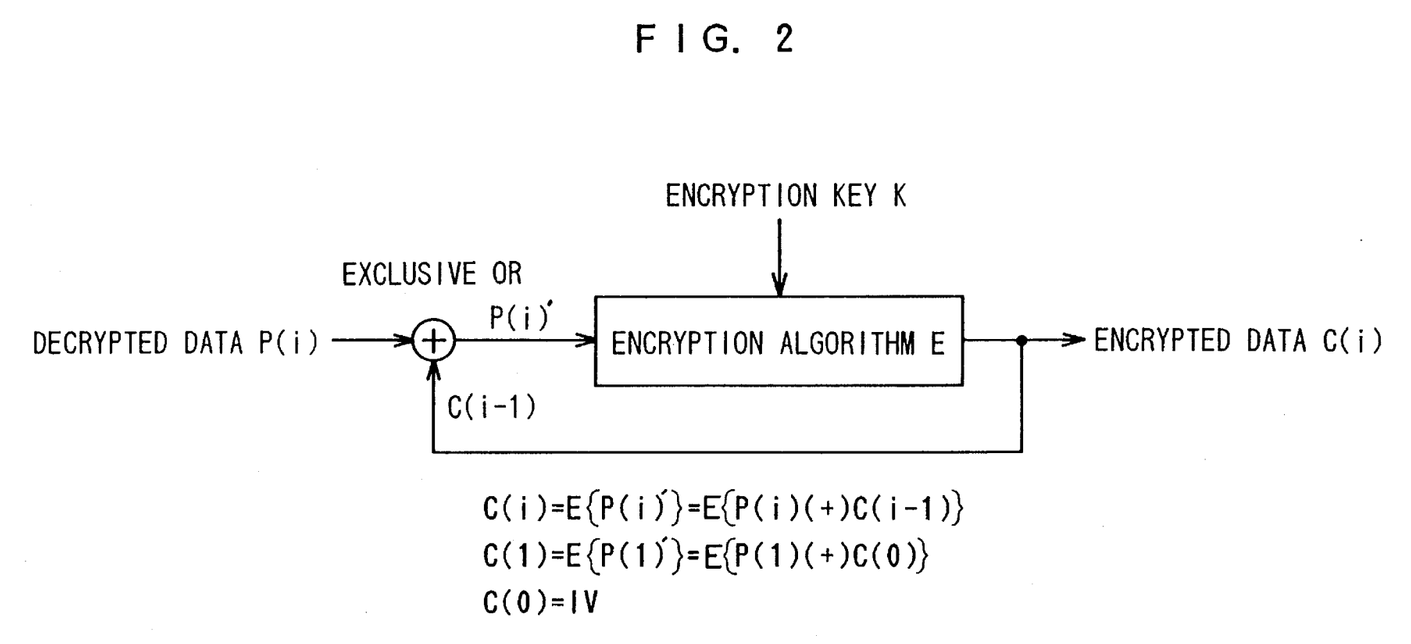
FIG. 2 is a diagram illustrating an encryption process in the CBC mode.

FIG. 2 is a diagram illustrating the encryption process in CBC mode. The transmission data is divided into plural units of data of a size equivalent to the bit number N of the encryption key K, and the encryption process is performed on a unit data basis. If an encryption key K comprises ten bits, for example, the transmission data is encrypted in units of ten bits.

In FIG. 2, decrypted data P(i) (i=1 to n) is the i-th unit of data having N bits. Plain-data P(i)' is obtained by exclusive-ORing the decrypted data P(i) with encrypted data C(i−1) corresponding to decrypted data P(i−1). Cipher-data C(i) having N bits is obtained by encrypting the decrypted data P(i)' with a predetermined encryption algorithm E by using a predetermined encryption key K. More specifically, the encrypted data C(i) is obtained through the following equation:

$$C(i)=E\{P(i)'\}=E\{P(i)(+)C(i-1)\}$$

where (+) means an exclusive-OR operation.

As can be understood from the foregoing, the decrypted data P(i) is transformed into different decrypted data P(i)' by exclusive-ORing the decrypted data P(i) with the encrypted data C(i−1) obtained by the encryption of the previous decrypted data P(i−1), and then transformed into the encrypted data C(i) by using the encryption algorithm E. In this case, since encrypted data C(O) to be used for the encryption of the first decrypted data P(1) does not exist, initial data IV is used as the encrypted data C(0) to transform the first decrypted data P(1) into the decrypted data P(1)' in the encryption process.

Where the transmission data includes plural units of image data obtained by reading a document original of plural pages, the transmission data is subjected to the encryption process in image data units (or on a page-by-page basis). In the CBC mode encryption process, respective decrypted data P(i) are linked in a chain by successively transforming the decrypted data P(i) into the plain data P(i)', and a set of data (decrypted data P(1) to P(n)) each subjected to the encryption process using the encryption algorithm E are encrypted as a whole. Therefore, if an error occurs when decrypted data P(k) is subjected to the encryption process, such error influences the subsequent encryption processes for decrypted data P(k+1) to P(n). As a result, it may become impossible to decrypt encrypted data C(k+1) to C(n).

In this embodiment, each image data unit corresponding to one page of the document original (or one-page of image data) is processed as the aforesaid data set in the CBC mode encryption process, so that an error occurring in one image data unit in the encryption process does not influence the subsequent image data units.

Figure 3:
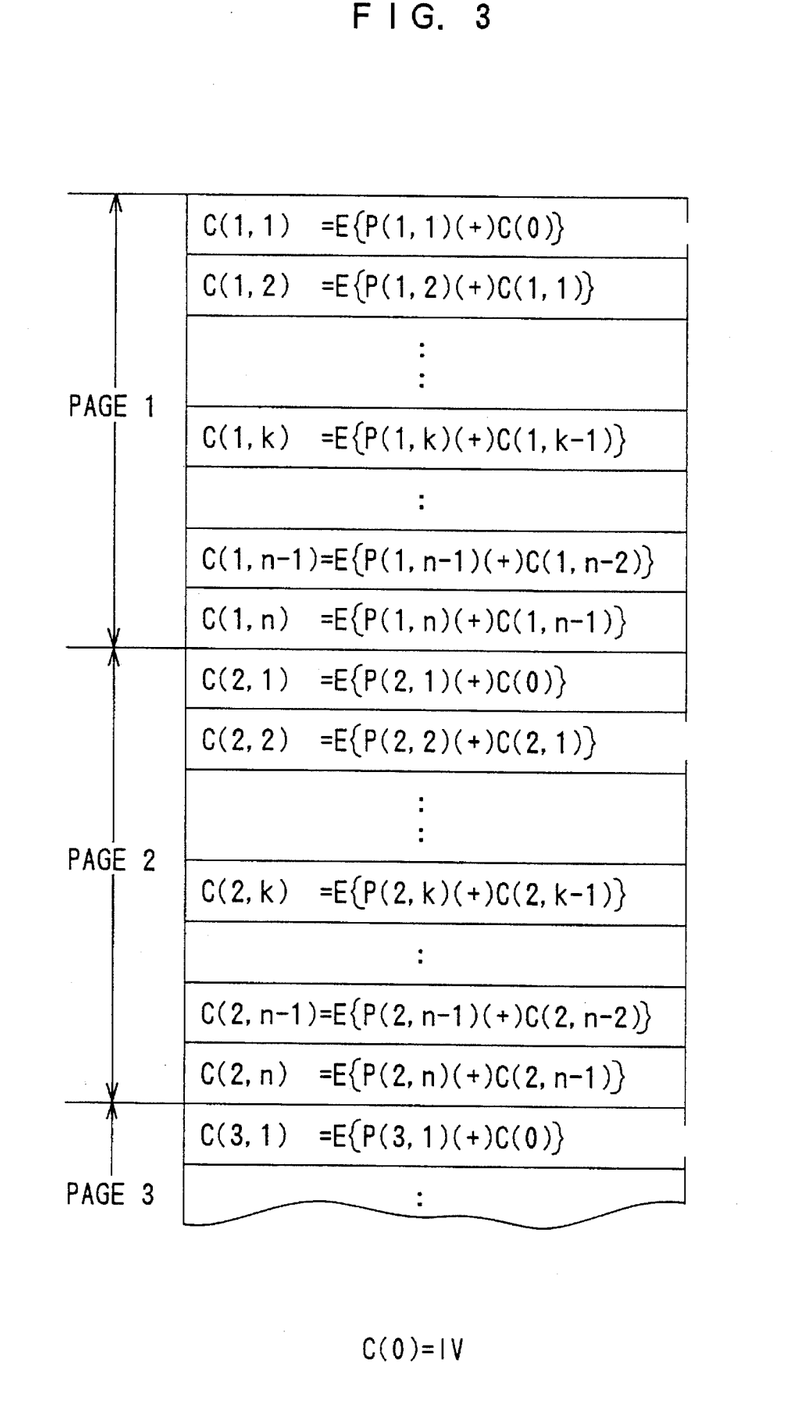
FIG. 3 is a diagram illustrating the configuration of encrypted data which are generated by subjecting original image data to the CBC mode encryption process on a page-by-page basis.

FIG. 3 is a diagram illustrating the configuration of encrypted data which are generated by subjecting original image data to the CBC mode encryption process on a page-by-page basis.

As shown, encrypted data C(1,k) (K=1 to n) are generated by encrypting unit data P(1,k) constituting image data of the first page of a document original. Similarly, encrypted data C(2,k) (k=1 to n) are generated by encrypting unit data P(2,k) constituting image data of the second page of the document original, and encrypted data C(3,k) are generated by encrypting unit data P(3,k) constituting image data of the third page of the document original. Cipher-data C(0) is set as initial data IV.

As shown in FIG. 3, decrypted data P(1,1), P(2,1), P(3,1), . . . corresponding to image data in the front portions of respective pages are first transformed into different decrypted data P(1,1)', P(2,1)', P(3,1)', . . . by using the initial data IV, and then the encryption process is performed on a unit data basis. Therefore, the encryption process for encrypting image data corresponding to one page does not influence the encryption processes for encrypting image data of the subsequent pages. For example, even if an error occurs when the unit data of the first page is subjected to the encryption process, such an error does not influence data of the subsequent pages.

Referring again to FIG. 1, the data processing circuit 404 performs predetermined data processing to the transmission data, reception data and communication data based on control signals from the controlling section 6 and transmit or print out data on a paper sheet.

More specifically, when data of a document original is transmitted via facsimile, the data processing circuit 404 stores the data of the document original read by the scanner section 2 in the memory 401. As soon as the controlling section 6 inputs a timing signal to start facsimile transmission, the transmission data is read out of the memory 401 by the data processing circuit 404, and then compressed at a predetermined compression rate by the compression/decompression circuit 402. Thereafter, the compressed data is encrypted by the encryption/decryption circuit 403 in response to an encryption instruction issued by the controlling section 6, and then the encrypted data is output to the data transferring section 5.

When data is received via facsimile, the data processing circuit 404 stores the data received by the data transferring section 5 in the memory 401. In response to a timing signal for starting recording which is input by the controlling section 6, the data processing circuit 404 reads out the reception data from the memory 401. Then, in response to a decryption instruction issued by the controlling section 6, the reception data is decrypted by the encryption/decryption circuit 403, and the decrypted data is decompressed at a predetermined decompression rate by the compression/decompression circuit 402. Thereafter, the decompressed data is output to the printer section 3.

The decryption processing method performed by the encryption/decryption circuit 403 at the time of data reception will be described later with reference to a flow chart shown in FIG. 7.

The data transferring section 5 includes a modem (modulator/demodulator) 501 for D/A and A/D conversions of data and an NCU (Network Control Unit) 502 for controlling the communicator selection and line connection.

The operation section 7 is used for: input of a facsimile number of a recipient facsimile machine for facsimile transmission; instruction to start/stop operation of facsimile transmission; registration, change and deletion of encryption keys K; registration of one-touch keys or short dialing numbers; and setting of various modes and conditions such as for confidential transmission.

By preliminarily assigning a facsimile number of a particular communicator to a one-touch key number or short dialing number for registration thereof, a user can input the one-touch key number or short dialing number to quickly and easily select the communicator for facsimile transmission. In a registration process for one-touch keys and short dialing numbers (hereinafter referred to as "communicator registration"), the name and facsimile number of a particular facsimile communicator and encryption key number assigned thereto are registered for a one-touch key number or short dialing number, and these registry data are stored in a communicator table in a RAM 602 incorporated in the controlling section 6.

Table 2 shows an exemplary communicator table.

Figure 4:
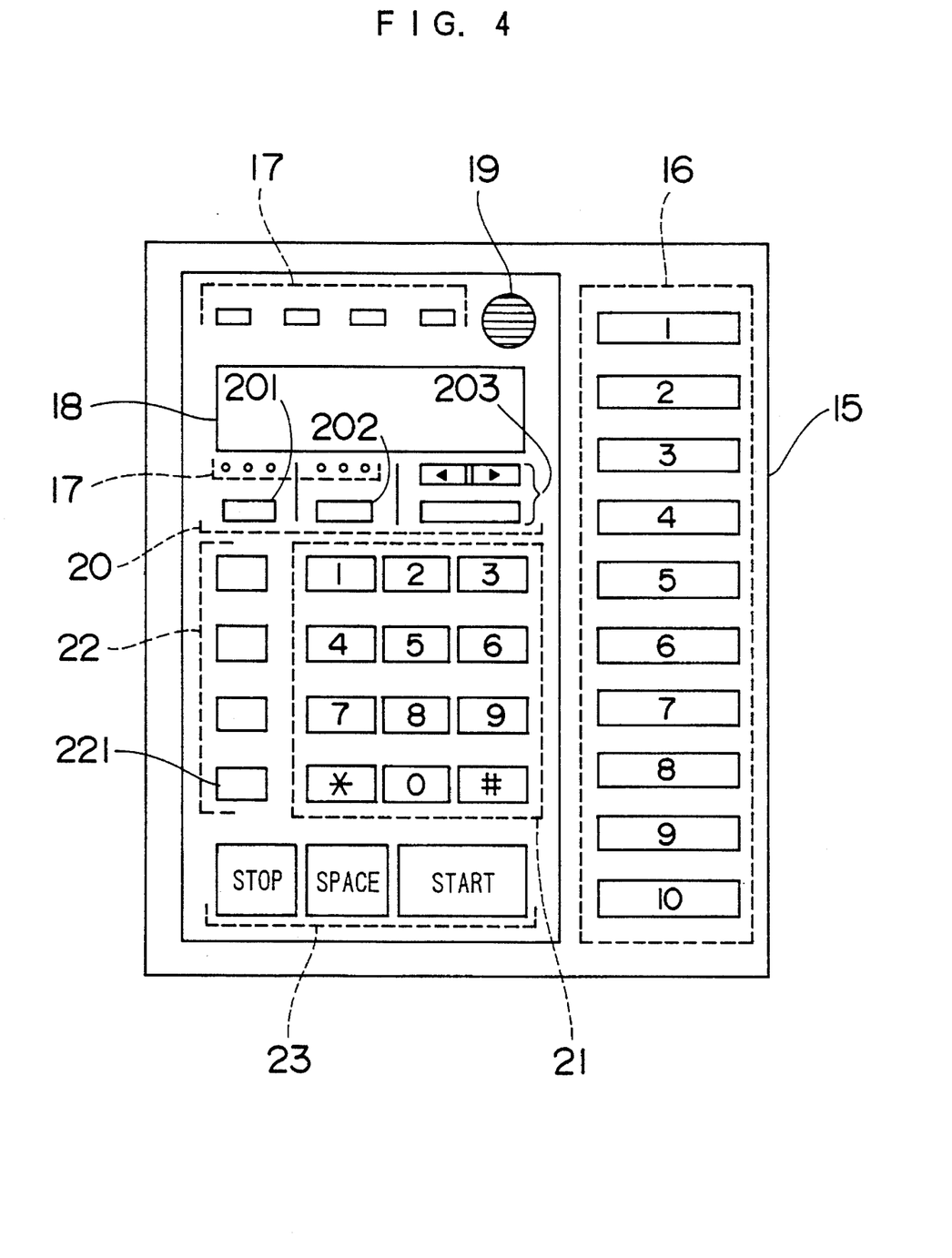
FIG. 4 is a diagram illustrating an operation section on an operation panel of a facsimile machine (encryption communication apparatus) in accordance with the present invention.

One-touch key numbers in Table 2 correspond to the numbers of the one-touch keys 16 (which are to be operated for facsimile transmission) shown in FIG. 4. In this embodiment, ten facsimile communicators can respectively be registered to ten one-touch keys. In Table 2, no facsimile communicators are registered to the one-touch key No.2, No.4, No.7 and No.8, and registration is made for the one-touch key No.1, No.5, No.6 and No.9 with encryption keys being assigned thereto, and for the one-touch key No.3 and No.10 without encryption keys.

TABLE 2

| No. | Communicators | Encryption key No. | FAX No. |
| --- | --- | --- | --- |
| 1 | ABCD | 1 | 06-764-1111 |
| 2 | | | |
| 3 | XXXX | | 03-3456-7890 |
| 4 | | | |
| 5 | AAAA | 3 | 06-123-4567 |
| 6 | abcd | 7 | 06-987-6543 |
| 7 | | | |
| 8 | | | |
| 9 | aaaa | 8 | 044-123-9876 |
| 10 | WXYZ | | 078-881-1212 |

The encryption key numbers correspond to those of the aforesaid encryption key table (see Table 1). When facsimile data is to be transmitted to a facsimile communicator "ABCD" registered to the one-touch key No.1, for example, the transmission data is encrypted for facsimile transmission by using the encryption key K (=0123456789) which corresponds to the encryption key No.1. The registration for the short dialing keys is made in the same format as shown in Table 2; that is, the name, facsimile number and encryption key number of a particular communicator are registered for a short dialing number.

The display portion 8 (FIG. 8) is adapted to display various kinds of information. Such information includes the name and facsimile number of a communicator counterpart, use of encryption communication mode, line connection condition and transmission condition for facsimile transmission, input data for encryption key registration and communicator registration, and encryption key non-registration state for facsimile reception, which are all displayed in the form of character information. The presence of communication error, setting mode, the quality of received image, facsimile reception subrogation by memory and need for maintenance are indicated by indicators in the display portion 8.

The speaker 9 is adapted to sound an alarm and provide a voice message corresponding to some displayed character information. For example, the speaker 9 sounds an alarm when facsimile transmission ends or when facsimile reception is started, and beeps or provides an audible alarm message to notify that a required encryption key K has not been registered for encryption facsimile transmission or reception.

FIG. 4 is a diagram illustrating an exemplary operation section and display portion disposed on an operation panel of a facsimile machine (encryption communication apparatus).

As shown, ten one-touch keys 16 are arranged in the right-hand portion of the operation panel 15. The numbers shown on the respective one-touch keys 16 indicate one-touch key numbers. An LCD display screen 18 for displaying character information is disposed in the left upper portion of the operation panel 15. A sound window 19 of the speaker 9 and plural LED indicators 17 are arranged above and below the LCD display screen 18. Selection keys 20, ten keys 21, function keys 22, start/stop keys 23 and the like are arranged below the indicators.

The one-touch keys 16 are multi-functional keys which are used to input such character information as the name of a communicator for the registration of one-touch keys and short dialing numbers. The input mode of the one-touch keys 16 can be changed for character information input by means of function keys 203 belonging to the selection keys 20.

The plural LED indicators 17 respectively correspond, for example, to a communication error, facsimile reception by memory, confidential facsimile reception and need for maintenance and, when any of such conditions occurs, the corresponding LED indicator lights. Other than these indicators, a plurality of LED indicators for indicating respective functional modes designated by selection keys 201 and 202 are provided, which are adapted to light in accordance with the designated functional mode.

The LCD display screen 18 can display information of several dozen characters in two lines. In respective character positions, a plurality of dots are arranged in a matrix configuration, and a given character is displayed by lighting predetermined dots.

The selection keys 201 and 202 are used, for example, for adjusting density and gray scale level of received image data, setting various modes, and changing input mode of multi-functional keys. For example, line density and gray scale level of such an image as a photograph are adjusted by the selection keys 201 and 202. The function keys 203 are used for setting various modes such as encryption key registration mode and communicator registration mode.

The ten keys 21 are used for inputting numbers and codes such as facsimile numbers of recipient facsimiles, encryption key numbers, encryption keys and short dialing numbers.

The function key 22 is used for performing various functions such as facsimile reception subrogation by the memory 401 and pause/redial function.

The start and stop keys 23 are respectively used for starting and stopping facsimile transmission after a facsimile number is input by using the ten keys 21 for facsimile transmission. Where a recipient facsimile is designated by a one-touch key or short dialing number, the facsimile number of the recipient facsimile is automatically input to the facsimile machine without operating the start key 23, and the facsimile transmission is automatically started as soon as the line connection is established.

Figure 5:
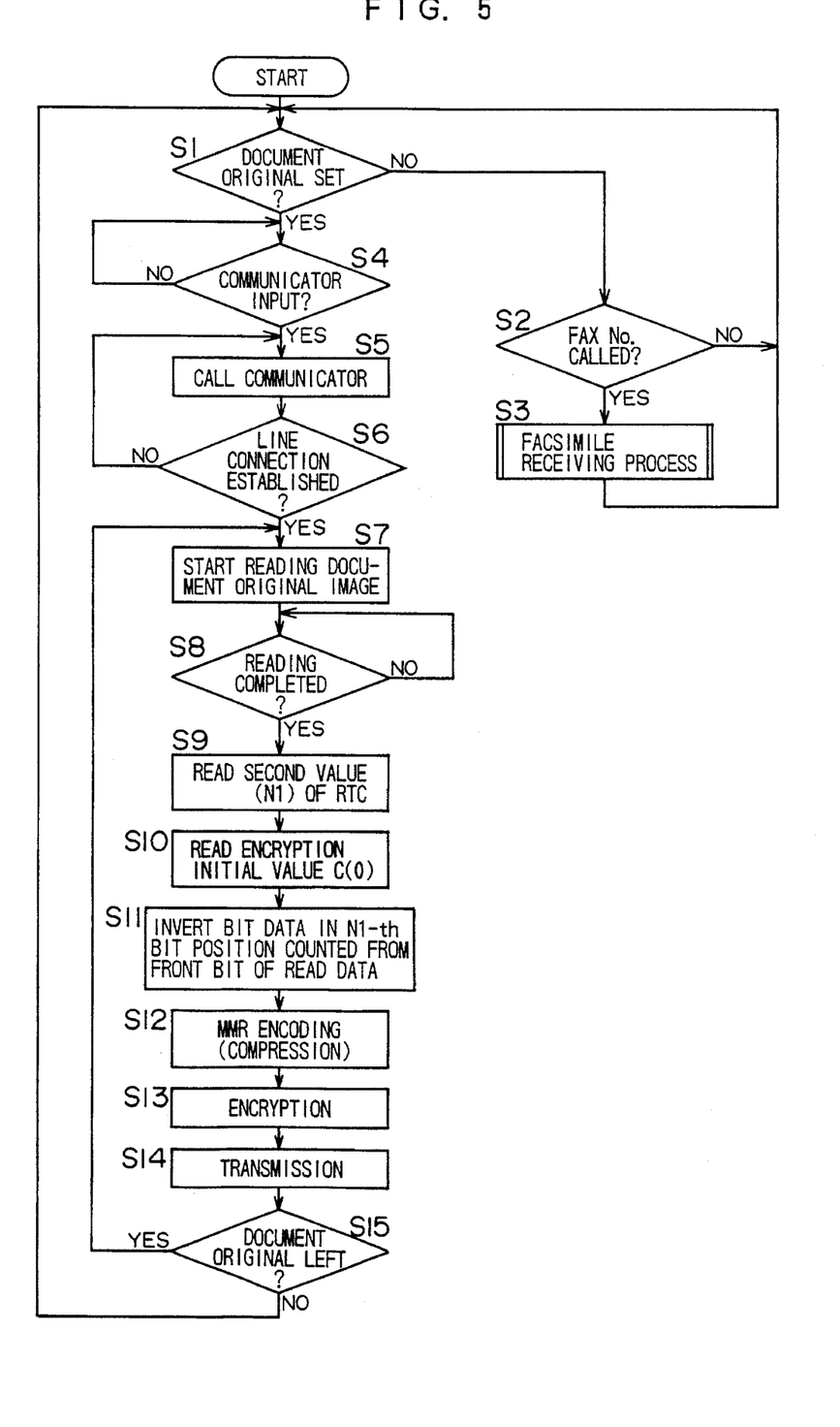
FIG. 5 is a flow chart illustrating a facsimile transmission controlling process for transmitting original image data through encryption communication.

Next, the facsimile transmission process for transmitting original image data through encryption communication will be described with reference to the flow chart shown in FIG. 5.

If a document original is set on the facsimile machine 1 (YES in step S1), the process goes into step S4 for facsimile transmission. If the facsimile number of the facsimile machine 1 is called (YES in step S2), the process goes into step S3 for facsimile reception.

In the facsimile transmission process, an operator is prompted for an input to designate a recipient facsimile. If the recipient facsimile is designated by the input (YES in step S4), the NCU 502 calls the recipient facsimile (step S5). If the connection is established between the facsimile machine 1 and the recipient facsimile machine via the phone line 10 (YES in step S6), the reading of image data of the document original set on the facsimile machine 1 is started (step S7).

When the reading of the first page of the document original is completed (YES in step S8), a value N1 of the second (an integer between 0 and 59) of the reading completion time is read out of a RTC (Real Time Clock) incorporated in the controlling section 6 (step S9), and initial data IV is read out of the RAM 602 and set in a encrypted data C(0) (step S10).

The binary-coded data D(N1) in an N1-th bit position counted from the front bit of the read image data is inverted (step S11). More specifically, if the binary-coded data is D(N1)=0, it is inverted to D(N1)=1, and if the binary-coded data is D(N1)=1, it is inverted to D(N1)=0.

Figure 6:
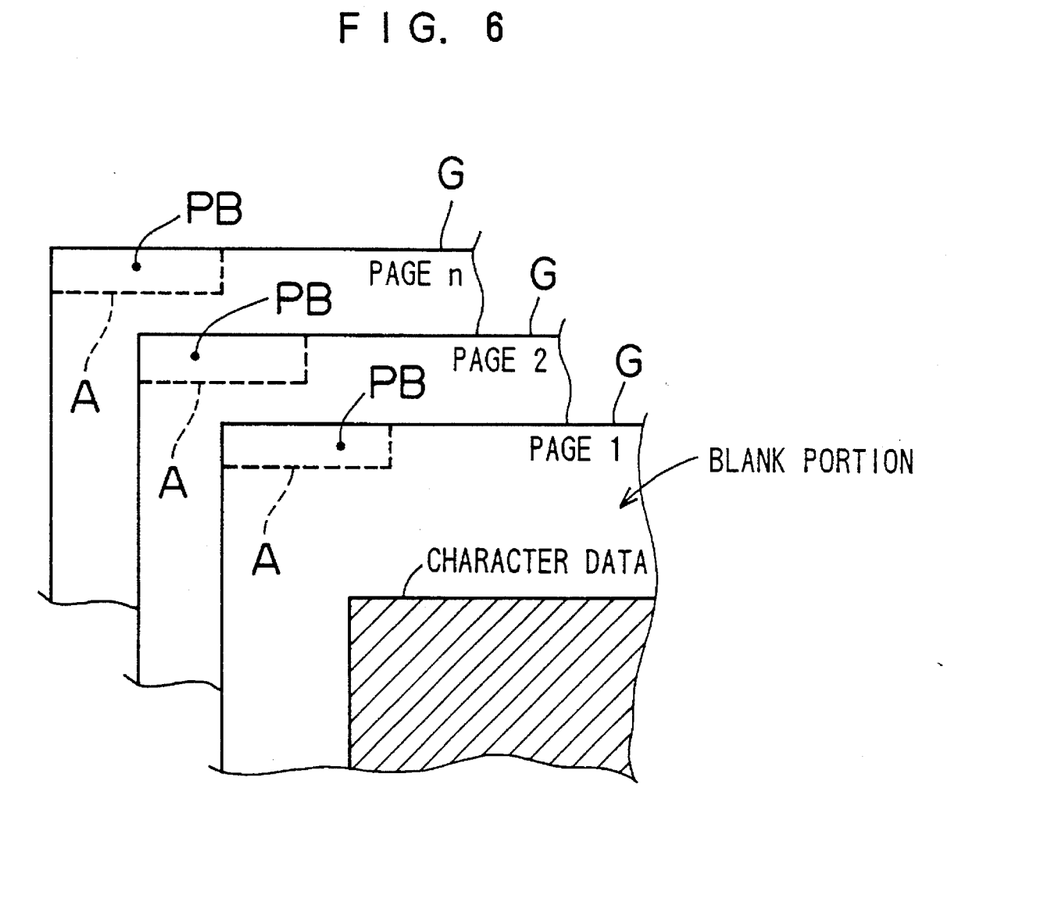
FIG. 6 is a diagram illustrating a state where image data of a document original of plural pages, each including an inverted bit in the front portion thereof, are printed out page by page on paper sheets.

The front portion of original image data corresponds to a blank portion of a document original in most cases and, therefore, the encryption pattern of encrypted data tends to become monotonous. Thus, the encrypted data may be easily decrypted from the front portion thereof. This is why the inversion of binary-coded data D(N1) in a given bit position within the front portion of the image data is carried out. By randomizing the decrypted data in the front portion of the image data, the encryption security can be enhanced.

Where the document original to be facsimiled has a plurality of pages, binary-coded data D(N1) in a given bit position within the front portion of image data corresponding to document original is inverted. That is, a black point PB is formed in an upper left blank portion A of each page of the document original, as shown in FIG. 6. On the other hand, if the upper left portion A is a black area, a white point PB is formed therein.

In turn, the image data is MMR-encoded (or compressed) in the compression/decompression circuit 402 (step S12), and is subjected to the CBC-mode encryption process in the encryption/decryption circuit 403 (step S13). Then, the encrypted data of the image data is transmitted to a recipient facsimile (step S14).

Upon completion of the transmission of the first-page image data, it is judged whether or not there still exist any other page of the document original (step S15). If there still exist another page to be transmitted (YES in step S15), the process returns to step S7 for facsimile transmission of image data of the next page. When the binary-coded data inversion step, encryption step and transmission step for all the pages of the document original are completed (NO in step 15), it is regarded that the facsimile transmission process is completed, and the process returns to step S1.

As has been described, since the binary-coded data (PB) in a Given bit position (PB) within the front portion A of the image data corresponding to each page of the document original is inverted as shown in FIG. 6 in accordance with this embodiment, higher encryption security is ensured for the encrypted data in the left upper blank portion A of each page of the document original. Therefore, the encrypted data cannot be easily decrypted from the portion A thereof.

Though binary-coded data in one bit position within the front portion A of each one-page image data is inverted in this embodiment, binary-coded data in plural bit positions may otherwise be inverted.

In the latter case, if the number of inverted binary-coded data is too large, it is possibly expected that white data are incorrectly inverted to black data, and the obtained document image becomes solid black. However, such a situation rarely occurs, since a very small number of inverted binary-coded data is set as compared with background pixels.

Further, since the bit position of binary-coded data to be inverted (hereinafter referred to as "inversion bit position") is designated by the value N of the second of the image-data-reading completion time, the inversion bit position can be easily randomized. Instead of employing only the value of a second, the values of hour, minute and second, e.g., a composite value of hour, minute and second, may be employed for the designation of the inversion bit position. Alternatively, a random number generated by a random number generator may be employed for the designation.

Still further, though this embodiment employs the CBC mode encryption which uses exclusive-ORs for encryption communication, an ordinary encryption process such as a so-called ECB mode encryption process may otherwise be employed.

Next, a facsimile reception process of the facsimile machine 1 for encryption communications will be described with reference to the flow chart shown in FIG. 7.

Cipher-data received via the NCU 502 are demodulated by the modem 501, and then sent to the data processing circuit 404. In the data processing circuit 404, the encrypted data is subjected to a decryption process performed by the encryption/decryption circuit 403 (step P1), and then pre-encryption image data is reproduced (step P2).

The reproduced image data includes inverted binary-coded data in the N1-th bit position counted from the front bit thereof. If the image data were printed out without bit inversion, the pixel to be reproduced corresponding to the binary-coded data in the N1-th bit position would have a binary value (black or white) opposite to that of the pixel in the transmitted image of the document original. Therefore, the original image data in the N1-th bit position counted from the front bit is identified by the data processing circuit 404, and is inverted back.

More specifically, original image data representing a binary value (black or white) different from those of the other original image data within the front portion of the image data is retrieved (step P3), and if identified as bit data that has been inverted in the transmitter facsimile machine, the binary-coded data is inverted back in the recipient facsimile machine (step P4). Thus, the original image data before bit inversion performed in the transmitter facsimile machine can correctly be reproduced. Then, the image data after bit inversion is sent to the memory 401, and printed out on a paper sheet in the printer section 3 for reproduction of the transmitted document original (step P5).

Figure 7:
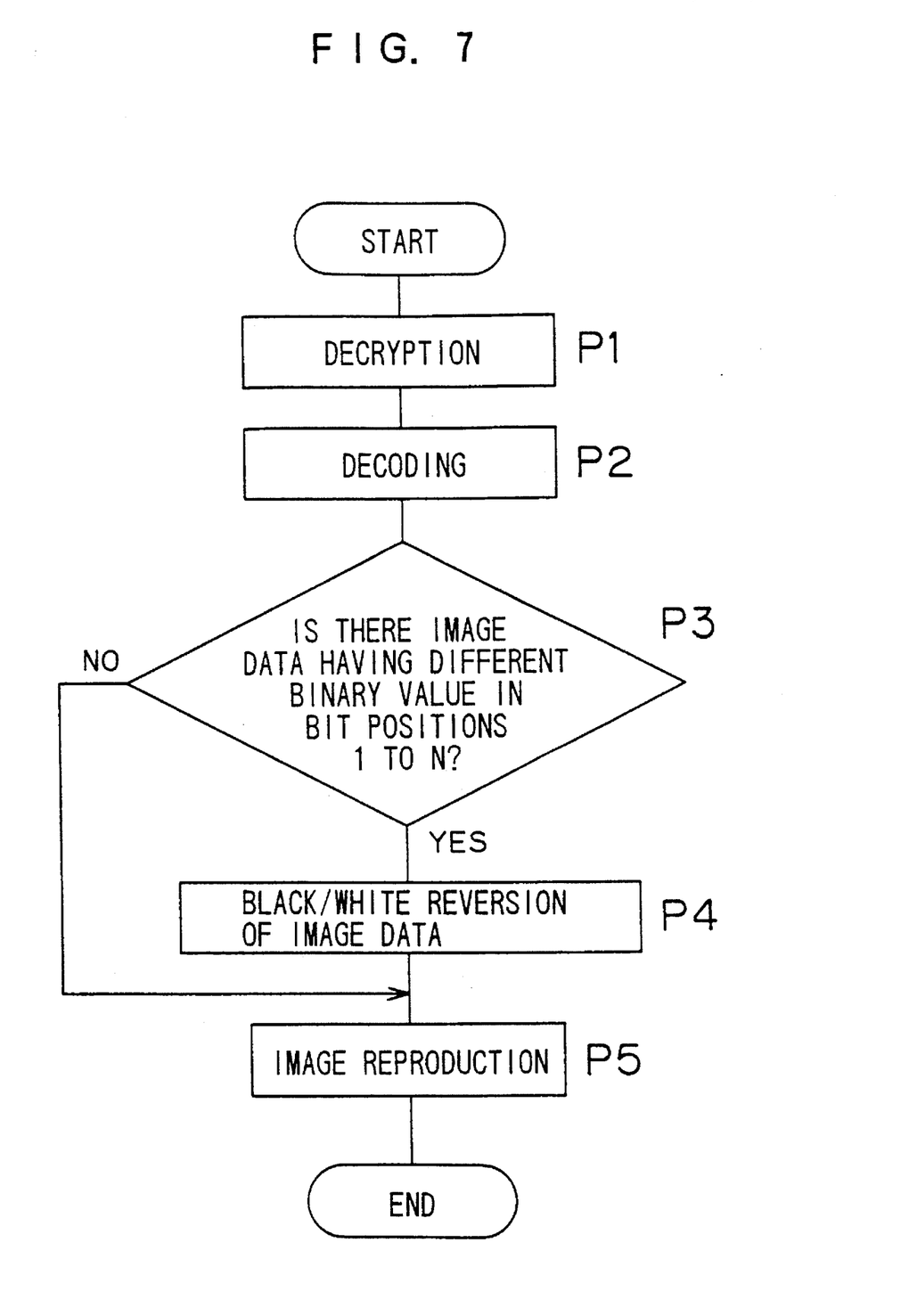
FIG. 7 is a flow chart illustrating a process for receiving encrypted data in a facsimile machine (encryption communication apparatus) in accordance with the present invention.

The bit inversion process shown in FIG. 7 is not necessarily required and, therefore, a facsimile machine capable of performing an ordinary facsimile receiving process may be employed as a recipient facsimile machine. Since the size of one pixel (or one dot) is about 0.1 mm (=1/200 inches), the deterioration in image quality may virtually be ignored, if the reproduced image data has a small number of inverted pixels in respect to peripheral pixels.

Though the foregoing embodiment employs a facsimile machine, the present invention can be applied to a personal computer which performs facsimile transmission via a FAX modem. In such an application, transmission data is divided into plural data in page units of a predetermined standard sheet size, similar to the foregoing embodiment. The encryption security of image data within the front portion A of each one-page data unit can be enhanced, and the influence of an error occurring in a particular one-page data unit can be prevented from spreading to the subsequent encryption processes.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An encryption communication apparatus for encrypting and transmitting data having binary-coded data strings of plural bits, said apparatus comprising:

data dividing means for dividing the data strings into a plurality of data units, each data unit representing image data for a sheet of data of a predetermined sheet size;

designating means for designating, for each data unit, one or more bit positions within a front blank portion of the data unit having a predetermined bit number, with the designated bit positions being different for each data unit;

bit data inverting means for inverting binary-coded data in the bit positions of the data unit designated by said designating means;

encrypting means for generating encrypted data by subjecting each data unit, including the binary-coded data inverted by the bit data inverting means, to a predetermined encryption process; and transmitting means for transmitting the encrypted data to a communication line.

2. An encryption communication apparatus as set forth in claim 1, wherein said designating means includes random number generating means for generating, for each data unit, one or more random numbers not greater than the predetermined bit number of the front portion of the unit data to designate said one or more bit positions.

3. An encryption communication apparatus as set forth in claim 2, wherein:

said designating means further includes clock means for detecting the present time; and said random number generating means generates said one or more random numbers based on the value of the second of the present time detected by said clock means.

4. A decryption communication apparatus for decrypting encrypted data transmitted via a communication line from an encryption communication apparatus as recited in claim 1, said decryption communication apparatus comprising:

decrypting means for subjecting received encrypted data to a predetermined decryption process to reproduce pre-encryption image data;

data identifying means for identifying bit positions, within a first blank portion in the pre-encryption image data, having binary coded data of a value different from the values of other binary coded data within the first blank portion; and inverting means for inverting the image data in bit positions identified by said data identifying means.

5. An encryption communication apparatus for encrypting and transmitting data having binary-coded data strings of plural bits, said apparatus comprising:

data reading means for reading original image data on a page-by-page basis;

designating means for designating, for each one-page image data unit of a document original read by said data reading means, one or more bit positions within the front blank portion of the data unit having a predetermined bit number, with the designated bit positions being different for each data unit;

bit data inverting means for inverting binary-coded data in the bit positions of the data unit designated by said designating means;

encrypting means for generating encrypted data by subjecting each data unit, including the binary-coded data inverted by the bit data inverting means, to a predetermined encryption process; and transmitting means for transmitting the encrypted data to a communication line.

6. An encryption communication apparatus as set forth in claim 5, wherein said designating means comprises:

clock means for detecting the present time; and second-value detecting means for detecting the value of the second of the present time detected by said clock means when reading of each one-page image data of the document original is completed for use to designate said one or more bit positions.

7. An encryption communication apparatus for encrypting and transmitting data having binary-coded data strings of plural bits, said apparatus comprising:

random number generating means for designating, for each data unit of a predetermined standard size, one or more bit positions within a front portion of the data unit having a predetermined bit number by generating one or more random numbers not greater than the predetermined bit number to designate the bit positions, bit data inverting means for inverting binary-coded data in the bit positions of the data unit designated by said random number generating means;

encrypting means for generating encrypted data by subjecting each data unit, including the binary-coded data inverted by the bit data inverting means, to a predetermined encryption process; and transmitting means for transmitting the encrypted data to a communication line.

8. An encryption communication apparatus as set forth in claim 7, further comprising clock means for detecting the present time;

wherein said random number generating means generates said one or more random numbers based on the value of the second of the present time detected by said clock means.

9. An encryption communication apparatus for encrypting and transmitting data having binary-coded data strings of plural bits, said apparatus comprising:

clock means for designating, for each data unit of a predetermined standard size, one or more bit positions within a front portion of the data unit having a predetermined bit number, by detecting the present time and the value of the second of the present time when the data unit is read and using the detected value to designate the one or more bit positions;

bit data inverting means for inverting binary-coded data in the bit positions of the data unit designated by said designating means;

encrypting means for generating encrypted data by subjecting each data unit, including the binary-coded data inverted by the bit data inverting means, to a predetermined encryption process; and transmitting means for transmitting the encrypted data to a communication line.

* * * * *